Oct. 11, 1955 — C. W. HANSEN — 2,720,424
DELIVERY PIPE FOR HARVESTER
Original Filed June 29, 1946 — 3 Sheets-Sheet 2

INVENTOR.
Charles W. Hansen
BY Soans, Blaister & Anderson
Attys.

Oct. 11, 1955 C. W. HANSEN 2,720,424
DELIVERY PIPE FOR HARVESTER
Original Filed June 29, 1946 3 Sheets-Sheet 3

INVENTOR.
Charles W. Hansen
BY
Soans, Plaister & Anderson
Attys

United States Patent Office 2,720,424
Patented Oct. 11, 1955

2,720,424

DELIVERY PIPE FOR HARVESTER

Charles W. Hansen, Racine, Wis., assignor to J. I. Case Company, Racine, Wis., a corporation of Wisconsin Original application June 29, 1946, Serial No. 680,447, now Patent No. 2,661,585, dated December 8, 1953. Divided and this application April 15, 1953, Serial No. 348,928

5 Claims. (Cl. 302—59)

The present invention relates generally to harvesting equipment and is particularly directed to a delivery pipe for a harvester.

During the operation of harvesters it is the usual practice to attach a short tongued wagon or trailer to the rear end of the harvester, or a wagon or truck may be driven alongside the harvester, for the purpose of collecting the cut crop material for transportation to the point of storage or other disposition. In either case there is necessarily involved a delivery pipe of considerable length, which extends from the harvester to a position alongside or to the rear thereof. This relatively long delivery pipe presents a definite problem in moving the harvester through gates, into barns, and along the highways.

The primary object of the present invention is to provide a novel and improved form of delivery pipe for a crop handling machine, such as a harvester, which is adaptable to being positioned on the machine to extend therefrom in a selected one of a plurality of positions. Another object of the invention is to provide a delivery pipe with novel and improved means affording folding of an outer section of the pipe to a position alongside the inner section thereof, to afford movement of the machine which includes the delivery pipe through relatively confined areas. Other objects and advantages of the invention will become apparent as the disclosure progresses with respect to the embodiment illustrated in the accompanying drawings, wherein:

Figure 1:
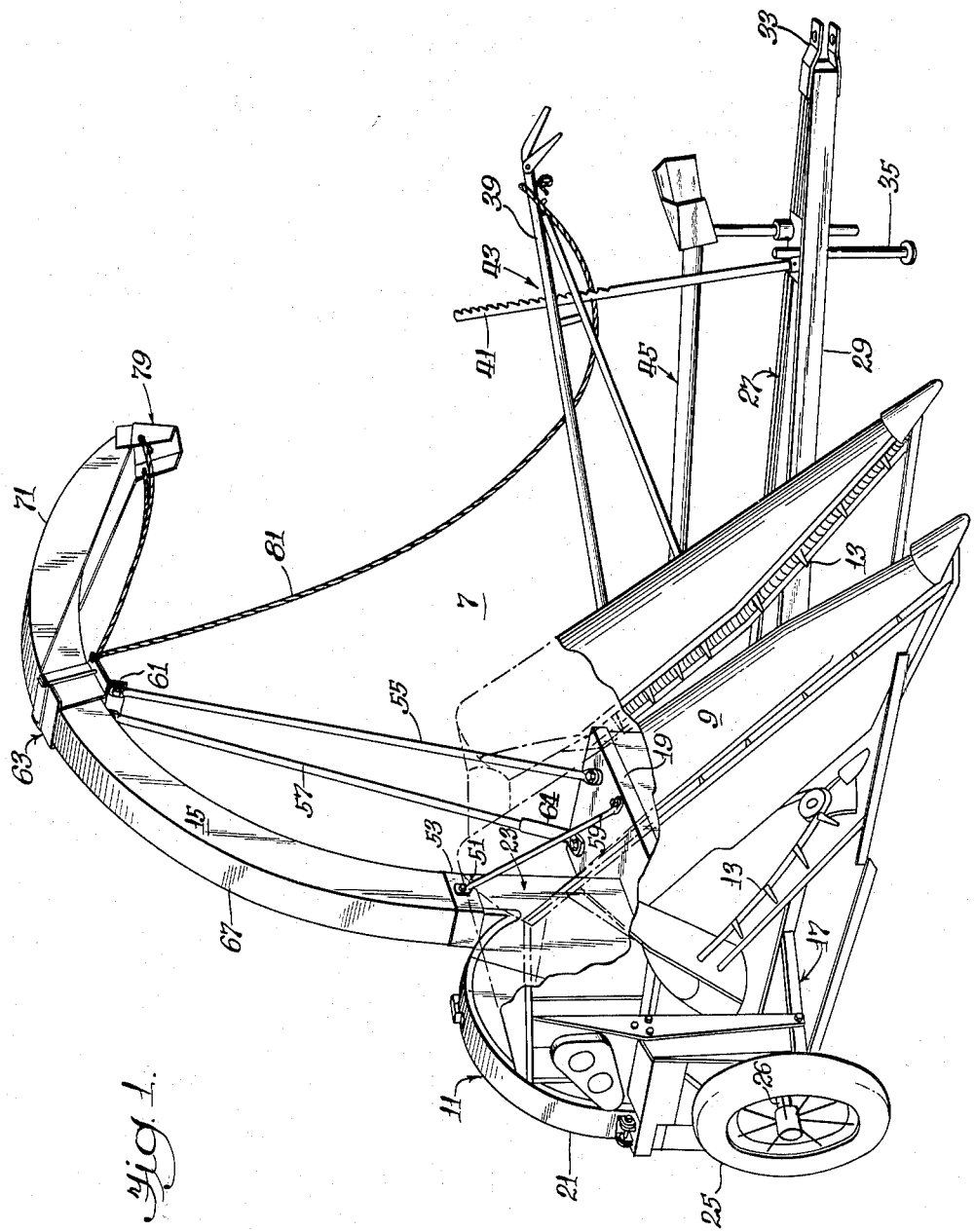
Figure 1 is a perspective view of a row crop forage harvester, with parts broken away, illustrating the delivery pipe positioned to extend to the side of the harvester.

To illustrate the present invention there is shown a forage crop harvester 7 (Fig. 1), of the type used in the harvesting of row-crop materials, which comprises a crop collecting and feeding unit 9 and a crop cutting and delivery unit 11. The harvester is operable to sever row fodder crops, such as corn and sorghum, and deliver them to the cutting and delivery unit 11, through means including the chain rake conveyors 13, where it is cut into suitable size pieces and subsequently discharged through a delivery pipe 15 to a suitable vehicle for transporting to a silo, silage trench, or other disposition point.

The particular forage crop harvester 7 illustrated in the drawings is more fully described in my copending application Serial No. 680,447, filed June 29, 1946, now U. S. Patent 2,661,585 dated December 8, 1953, of which the present application is a division.

The crop cutting and delivery unit 11 supports the complete harvester and includes a main frame 17 which is fabricated of suitable plate, angle and channel structural members which define a generally horizontal platform portion 19 and a housing 21 for the rotatable cutter and blower wheel means (not shown). At one side of the blower housing 21 there is provided an outlet conduit 23 for the cut crop material and the discharge or delivery pipe 15 extends from the outlet 23.

Suitable support wheels 25 are journalled on an axle 26, which is fixed to the frame 17, in order that the harvester may be moved during use. A fabricated yoke-shaped drawbar 27, which includes a pair of channel side sections 29, is suitably connected to the axle carrying wheels 25 for hinged movement relative thereto. The forward end of the drawbar 27 is provided with a clevis 33 for connection to a tractor drawbar (not shown) by means of a suitable hitch pin. An adjustable stand 35 is provided in order that the drawbar 27 may be supported at the proper elevation while the harvester is being hitched to the tractor. The stand 35 is, of course, raised during travelling movement of the harvester.

In order to provide for adjustment of the crop collecting unit 9 relative to the ground, there is also provided an adjustable connecting means between the drawbar 27 and the frame 17. This connecting means includes a forwardly extending adjusting lever 39 rigidly affixed to the blower and cutter frame 17, a notched link 41 supported at its lower end on the drawbar 27, and a spring latch connection designated at 43 providing for detachable engagement of the lever 39 with a selected one of the notches at the upper end of the link 41. It will be apparent that vertical movement of the adjusting lever 39, relative to the drawbar 27, will rotate the attached crop collecting unit 9 and crop cutting unit 11 about the axis of the axle 26, thereby altering the position of the crop collecting unit relative to the ground lever.

The forage harvester 7 also includes a suitable enclosed power take-off shaft 45, extending forwardly from the main portion of the harvester, in supported overlying relation to the drawbar 27, to a position adjacent the clevis 33 for connection with a power take-off on the tractor. The shaft 45 provides for the transmission of power to a suitable drive mechanism on the harvester, a portion of which is indicated at 49 in Figs. 2 and 5, for operating the crop cutting and delivery unit 11.

The arrangement and structure of the delivery pipe 15 for the crop cutting and delivery unit 11 makes possible the delivery of the cut crop to either the rear or the side of the harvester, as may be required. More specifically, the outlet conduit 23 for the blower housing 21 is preferably made square at its outer end 51, in order that it may receive the square inner end section 53 of the delivery pipe to selectively position the delivery pipe 15 to the side, as shown in Figs. 1 and 2, or to rear as shown in Fig. 5.

There is preferably provided three bracing members 55, 57 and 59 (Fig. 1) which are adapted to properly support the delivery pipe 15 in either selected position. The two braces 55 and 57 are relatively rigid, elongated members which are bolted at one end to the platform 19 of the frame 17 and extend upwardly therefrom to a bolted connection at the other end with a bracket plate 61 which is provided at the central portion of the delivery pipe. The third brace 59 is a short tie member which extends from the lower end 53 of the delivery pipe 15 to the front of the frame platform 19, primarily to hold the lower end of the delivery pipe in tight engagement with the cooperating outer end section 51 of the blower outlet 23.

Figure 2:
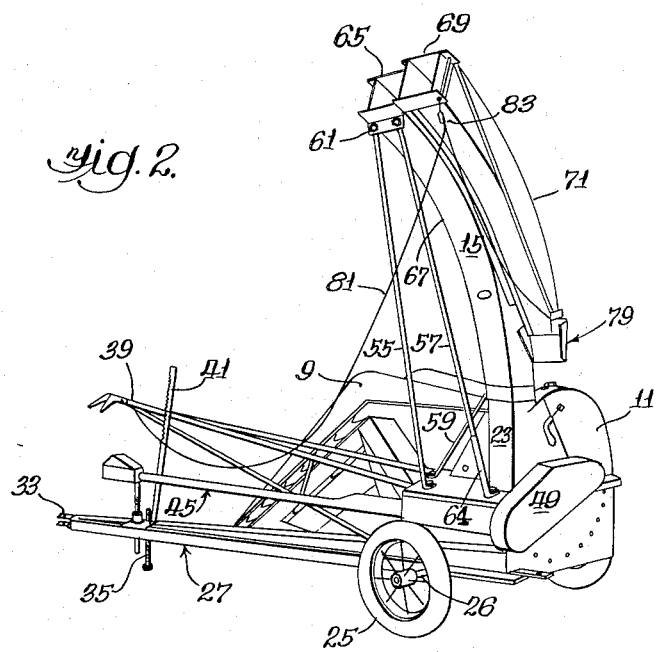
Figure 2 is another perspective view of the harvester in Figure 1, reduced in scale, with the delivery pipe folded back into transport position.
Figure 5:
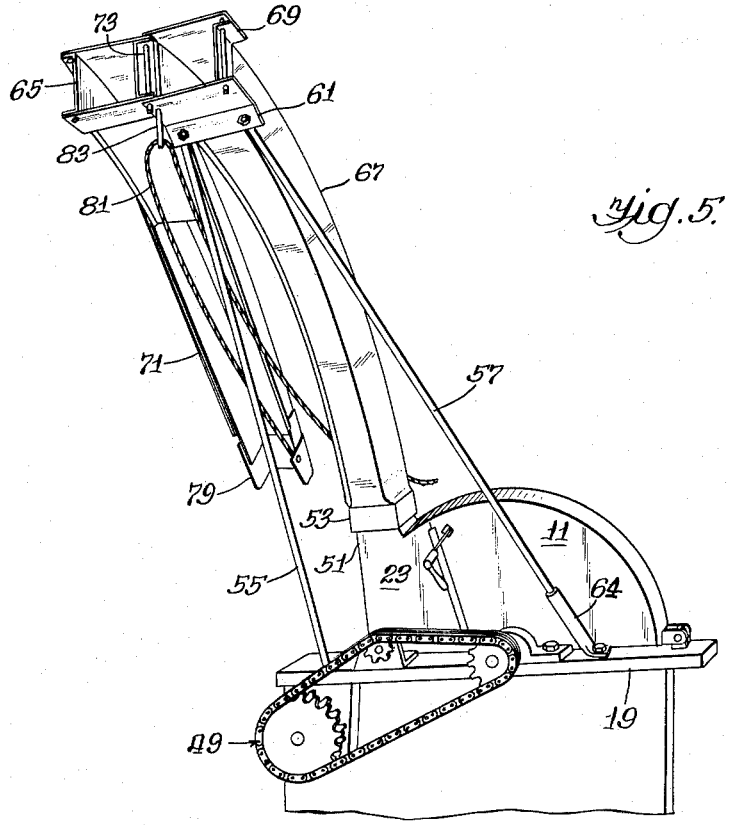
Figure 5 is an enlarged perspective view of a portion of the harvester, illustrating the delivery pipe positioned to extend to the rear of the harvester and folded back into transport position.

When it is desired to move the delivery pipe 15 from the side discharge position, shown in Figs. 1 and 2, to the rear discharge position shown in Fig. 5, the bolts attaching the two main braces 55 and 57 are released, the upper end of the smaller brace 59 is disengaged from the lower end 53 of the delivery pipe, and the entire delivery pipe is lifted off the outlet end 51 of the blower housing and rotated 90°. The two main braces 55 and 57 are very useful at this time in holding the delivery pipe in proper position. After the rotation of the pipe 15 has been completed and the cooperating square portions 51 and 53 reengaged, the two main braces 55 and 57 are reattached to the paltform 19, as shown in Fig. 5. It will be noted that the brace 55, which was previously located in front of the blower housing 21, is now moved around to substantially the same position that was previously occupied by the other long brace 57, and that the brace 57 is now attached to the platform in rear of the blower housing 21 adjacent the opposite side of the latter. An adjustable section 64 is provided at the lower end of the brace 57, in order that its length may be adjusted the required amount during this operation of relocating the delivery pipe 15.

As indicated previously, the delivery pipe 15 is constructed to provide for folding the pipe on itself, so as to prevent it from projecting materially beyond the support wheels 25 for the harvester. This feature of construction is very advantageous in the movement of the harvester on the highway and through fence gates and the like. In the illustrated embodiment the delivery pipe is divided intermediate its ends, at approximately the midpoint thereof, by the hinge connection 63.

Figure 3:
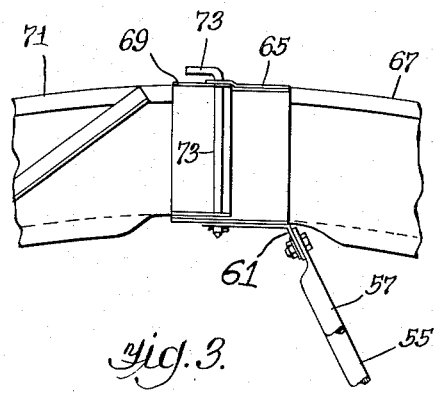
Figure 3 is an enlarged, side elevational view of the delivery pipe hinge connection.
Figure 4:
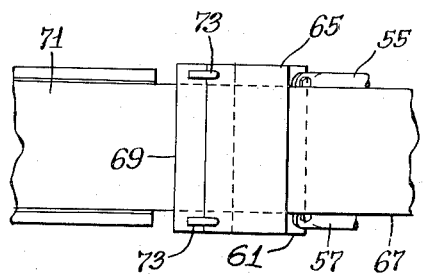
Figure 4 is a plan view of the structure illustrated in Figure 3.
Figure 6:
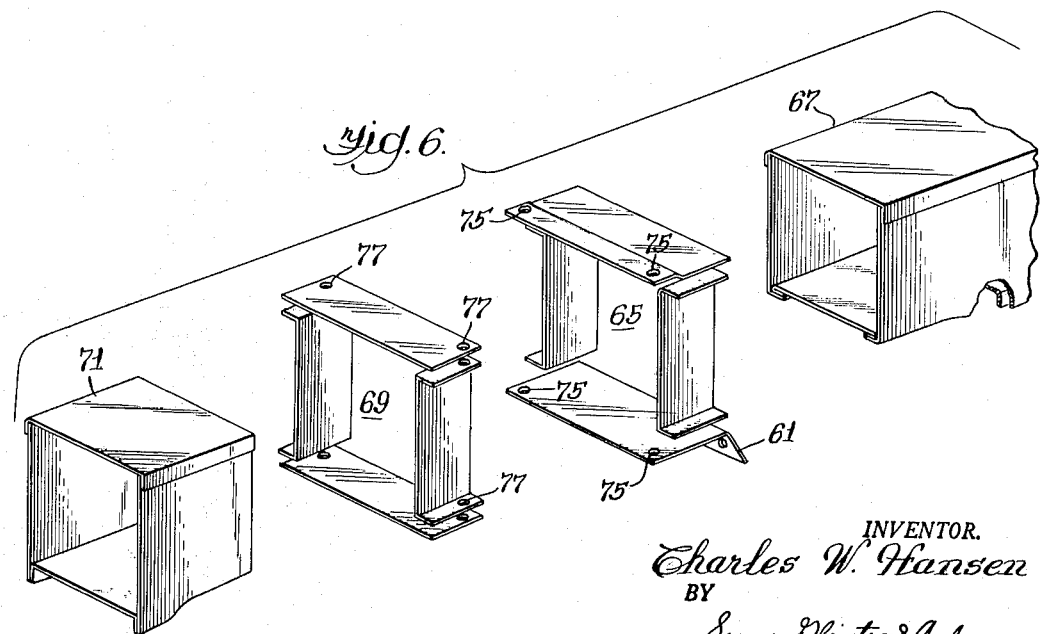
Figure 6 is an enlarged, exploded perspective view showing certain details of the construction of the hinge connection constituting a part of the delivery pipe.

The hinge connection 63 comprises a box-like structure 65 which is affixed to the inner pipe section 67, as shown particularly in Figs. 3, 4 and 6, a cooperating box-like structure 69 attached to the outer delivery pipe section 71, and a pair of hinge pins 73 which extend through aligned openings 75 and 77 in the box-like structures 65 and 69, respectively. It will be noted that removal of either of the hinge pins 73 permits the outer section 71 of the delivery pipe 15 to be swung around the other pin 73 out of endwise engagement with the inner section 67 and into a position along side of the latter, as seen in Figs. 2 and 5. Furthermore, the outer section 71 may be swung in either direction in order that it will clear the brace members 55 and 57, regardless of the position of the delivery pipe 15. This arrangement is decidedly advantageous over folding pipes which are moved in a generally vertical plane.

As indicated generally at 79, there is also provided a hinged deflector means for the outer end of the delivery pipe 15 which is controlled through a rope 81 extending from the deflector 79 through suitable guide and support means 83 to a position adjacent the handle for the spring latch connection 43 at the forward end of the height adjusting lever 39. The operator may thus alter the direction of delivery of the cut crops between fairly wide limits by simply pulling the rope 81. A detailed description of this hinged deflector means may be found in the above-mentioned copending application Serial No. 680,447 and in my copending application Serial No. 348,209, filed April 13, 1953.

Thus it is seen that a delivery pipe constructed in accordance with the present invention affords definite advantages in providing for delivery of material either to the side or the rear of the crop processing machine to which the pipe is attached, and in permitting the folding of the pipe in a novel and improved manner to facilitate movement of the machine on the highway and through fence gates and the like. While illustrated in conjunction with a forage crop harvester, it is apparent that the principles of this invention are equally applicable to delivery pipes for other types of material handling apparatus.

I claim:
1. In a blower-operated material handling apparatus having a discharge conduit, a delivery pipe curved along its longitudinal axis, interfitting end sections on said discharge conduit and delivery pipe affording a telescopic connection therebetween with said curved delivery pipe disposed in any one of a plurality of angularly displaced positions, said delivery pipe comprising inner and outer sections interconnected by a hinge connection affording swinging movement of the outer section about a generally vertical axis into a position alongside of said inner section.

2. Delivery means for use with a cutting and delivery unit which includes a frame, a housing supported on said frame having a crop inlet and a cut crop discharge opening, and cutter and blower means supported for rotation within said housing, said delivery means including a delivery pipe which is detachably connectible with the discharge opening of said housing, said delivery pipe being curved and comprising cooperating, inner and outer half sections which are held together by a hinge connection which permits the outer half section to be swung about a generally vertical axis into a position alongside of the inner half section, and means for supporting said delivery pipe with the inner end thereof connected with said discharge opening, said support means including a pair of skewed braces extending upwardly from said frame to the inner half section of said delivery pipe adjacent said hinge connection.

3. Delivery means for use with a cutting and delivery unit which is adapted to be drawn about a field and which includes a frame having a transverse axle, support wheels supported on the ends of said axle, a housing which is supported on said frame and which includes a crop inlet opening and a cut crop discharge conduit, and cutter and blower means supported for rotation in said housing, said delivery means including a delivery pipe which is detachably connectible with said discharge conduit, said delivery pipe being curved in generally semi-circular form, said pipe being supported at its lower end in vertically extending relation to said discharge conduit on said housing by means which permits said delivery pipe to be selectively positioned in a plane substantially parallel to said axle and in a plane which extends substantially at right angles to said axle, said support means including a square fitting at the inner end of said delivery pipe, a cooperating square fitting at the discharge end of said discharge conduit whereby said delivery pipe can be engaged in said discharge conduit in one of the aforesaid positions, said delivery pipe being fabricated from two cooperating half sections which are held together by a hinge connection which permits the outer half section of said discharge pipe to be swung about either of two vertical axes into a position along either side of the other half section of said delivery pipe, said hinge connection including a pair of spaced-apart plate members which are affixed to the top and bottom of the outer end of the inner half section of said discharge pipe, said plate members projecting beyond the end of said inner pipe section and being provided with vertically aligned holes at either side thereof for receiving vertically disposed hinge pins, the inner end of the outer half section of said delivery pipe being provided with cooperating vertically spaced-apart plate members having similarly aligned holes for receiving said hinge pins, the relative dimensions of said parts being such that said hinge pins normally hold said half sections in engagement with each other and being such that removal of either hinge pin permits the outer half section of said pipe to be swung around the other hinge pin to one of said positions alongside of said delivery pipe, and a pair of bracing members for supporting said delivery pipe intermediate the ends thereof, one end of each of said braces being permanently attached to the inner section of said delivery pipe adjacent said hinge connection, and the other end of each of said bracing members being adapted to be releasably attached to said frame in differing positions depending upon the position of said delivery pipe, at least one of said bracing members being adjustable in length.

4. Delivery means for use with a cutting and delivery unit which includes a frame, a housing supported on said frame having a crop inlet and a cut crop discharge opening, and cutter and blower means supported for rotation within said housing, said delivery means including a delivery pipe telescopically connected with said discharge opening, said delivery pipe and said discharge opening having complementary interfitting end sections whereby said delivery pipe may be disposed in any one of a plurality of angularly displaced positions in extending relation to said discharge opening, said delivery pipe being curved and comprising cooperating inner and outer sections which are held together by a hinge connection which permits the outer half section to be swung about a generally vertical axis into a position alongside of the inner half section, and means for supporting said delivery pipe including a pair of braces extending upwardly from said frame to the inner half section of said delivery pipe adjacent said hinge connection.

5. Delivery means for use with a cutting and delivery unit which includes a frame, a housing supported on said frame having a crop inlet and a cut crop discharge opening, and cutter and blower means supported for rotation within said housing, said delivery means including a delivery pipe telescopically connected with said discharge opening, said delivery pipe and said discharge opening having complementary interfitting, polygonal end sections affording disposition of said delivery pipe in fixed relation to said discharge opening in any one of a plurality of angularly displaced positions, said delivery pipe being curved and comprising cooperating inner and outer sections which are held together by a hinge connection which permits the outer section to be swung about a selected one of two vertical axes into a position along either side of the inner section of said delivery pipe, means for supporting said delivery pipe including a pair of braces extending upwardly from said frame to the inner section of said delivery pipe adjacent said hinge connection, and a plurality of spaced-apart attaching means on said frame for connection with the lower ends of said braces in position to accommodate said plurality of positions for said delivery pipe, at least one of said braces being adjustable in length.

References Cited in the file of this patent

UNITED STATES PATENTS

| | | |
|---|---|---|
| 1,724,548 | Barcus | Aug. 13, 1929 |
| 2,493,918 | Hill | Jan. 10, 1950 |
| 2,507,742 | Tuft | May 16, 1950 |
| 2,534,266 | Howe | Dec. 19, 1950 |
| 2,603,351 | Vedder | July 15, 1952 |